United States Patent [19]

Katsuyama

[11] Patent Number: 4,531,819
[45] Date of Patent: Jul. 30, 1985

[54] DEVICE FOR STORING EXPOSED FILM FOR PHOTOGRAPHING AND DEVELOPING APPARATUS

[75] Inventor: Tsutomu Katsuyama, Yokohama, Japan

[73] Assignee: Bell & Howell Japan Ltd., Tokyo, Japan

[21] Appl. No.: 584,149

[22] Filed: Feb. 27, 1984

[30] Foreign Application Priority Data

Mar. 1, 1983 [JP] Japan .................................. 58-31753

[51] Int. Cl.³ .............................................. G03B 17/50
[52] U.S. Cl. ........................................ 354/92; 354/93; 354/211; 352/72; 355/28
[58] Field of Search ......................... 354/90, 91, 92, 93, 354/211, 298, 319, 320, 321, 322; 352/72, 78 R, 76, 130; 355/27, 28

[56] References Cited

U.S. PATENT DOCUMENTS

| 3,295,427 | 1/1967 | Oswald | 352/78 R |
|---|---|---|---|
| 3,511,160 | 5/1970 | Van Reusel | 354/298 |
| 3,557,675 | 1/1971 | Koll et al. | 354/92 |
| 3,987,465 | 10/1976 | Sippel | 355/27 |
| 4,260,234 | 4/1981 | Burton | 354/319 |
| 4,370,041 | 1/1983 | Katsuyama | 354/92 |

FOREIGN PATENT DOCUMENTS 2036988 7/1980 United Kingdom ................ 354/93

Primary Examiner—A. A. Mathews
Attorney, Agent, or Firm—Cullen, Sloman, Cantor, Grauer, Scott & Rutherford

[57] ABSTRACT

A device for storing exposed film for a photographing and developing apparatus comprises a first pinch roller pair provided in the vicinity of a storage reel, a second pinch roller pair provided at a spacing from the storage reel and a guide means for guiding exposed film from the first pinch roller pair to the second pinch roller pair. The first and second pinch roller pairs, the guide means and associated film transport roller means are controlled as to the direction of rotation and position, whereby an exposed film portion supplied from a photographing unit is taken up once on a film storage reel and then reliably fed to a developing unit by the action of the guide member.

11 Claims, 8 Drawing Figures

DEVICE FOR STORING EXPOSED FILM FOR PHOTOGRAPHING AND DEVELOPING APPARATUS

BACKGROUND OF THE INVENTION

This invention relates to a device for storing exposed film for a photographing and developing apparatus, which uses a roll film such as a microfilm and in which photographing of various materials and development of the exposed film are carried out. More particularly, the invention concerns improvements in a device for storing an exposed film for a photographing and developing apparatus, in which an exposed portion of an elongate roll film after exposure in the photographing of an object (a document, for example) in a photographing unit is taken up on a storage reel and, when developing the film from an intermediate part, the film is cut at a position after its exposed portion and then the exposed portion having been taken up on the storage reel is fed backwards from its trailing end to a developing unit to effect development.

Photographing and developing apparatuses using microfilms or the like serve important roles in the recording and orderly storage of various documents involved in transactions relating to checks and bonds at banks and other financial organs. Apparatuses of the type noted are finding extensive applications not only in the financial field but also in many other industrial fields including general business and industrial designing and manufacturing.

The photographing and developing apparatus using a microfilm for recording is required to be easily handled and capable of reliable execution of its functions as well as to provide high performance. To meet such requirements, the inventor has earlier proposed a photographing and developing apparatus disclosed in Japanese Patent Application Disclosure Sho 56-43632 (corresponding to U.S. Pat. No. 4,370,041), Japanese Patent Application Public Disclosure Sho 56-43633 and Japanese Patent Application Public Disclosure Sho 56-121026.

The basic function of the photographing and developing apparatus of this type is to feed out an elongate film in the form of a roll frame by frame for photographing, take up the exposed film on a storage reel (as disclosed in Japanese Patent Application Public Disclosures Sho 56-43632 and Sho 56-121026) or store it in a storage chamber (as disclosed in Japanese Patent Application Public Disclosure Sho 56-43633) and cut and feed out the film portion which has been used for photographing for each day, for instance, to a developing unit when developing that portion of the film. Although all of the technologies noted above seek to improve the performance and ensure accurate and reliable driving of the film, each entails certain problems. Japanese Patent Application Public Disclosure Sho 56-121026, for instance, has problems in the accurate and reliable driving of film. The disclosed photographing and developing apparatus has a photographing unit disposed as an upper section and a developing unit disposed as a lower section. A storage reel is supported above a roll film provided in the photographing unit. When photographing a document, the film is forwarded, and the exposed film is led to a guide path, which has an upper end directed to the storage reel, from below the guide path to be taken up on the storage reel. When developing the exposed portion of the film, the film is first forwarded until the trailing end of the exposed film portion enters the lower end of the guide path, and then the film is cut at the lower end of the guide path. Thereafter, the separated exposed film portion is fed backward from the lower end of the guide path to the developing unit for development. While this arrangement can sufficiently fulfill its aim, in the backward feeding of the separated exposed film for development the cut trailing end is led out without being supported in any way from the lower end of the guide path and proceeds in this state toward the developing unit. Therefore, there is a possibility that the cut end may fail to reach the developing unit.

SUMMARY OF THE INVENTION

An object of the invention is to provide a device for storing exposed film for a photographing and developing apparatus of the type in which an elongate film having been exposed for photographing in a photographing unit is temporarily taken up on a storage reel and subsequently cut out from the remainder of the film and fed to a developing unit, which device can reliably feed the exposed film portion to the developing unit and improve the performance of the photographing and developing apparatus.

According to the invention, the above object is achieved by a device for storing exposed film for a photographing and developing apparatus, which comprises a first pinch roller pair provided relatively nearer the storage reel, a second pinch roller pair provided relatevily remote from the storage reel, a cutter disposed above the pinch roller pairs, a feed roller pair disposed above the cutter and adapted to feed film exposed in a photographing unit toward the storage reel, and a guide member disposed between the first and second pinch roller pairs.

The film exposed to the data in the photographing unit is fed to the storage reel by forwardly rotating the feed roller and the first pinch roller pair and taken up by the reel. When the exposed portion of the film has been completely taken up by the reel, the film is cut by means of the cutter. To forward the exposed film wound on the reel to the developing unit, the first pinch roller pair is reversely rotated so as to rewind the exposed film from the reel and advance it along the guide member toward the second pinch roller pair which is rotated in the same direction as the first pinch roller pair.

As a guide member, there may be used a switchable guide means capable of guiding exposed film. The switchable guide means is arranged between the first and second pinch roller pairs in such a state that the one end thereof is pivotally mounted in the vicinity of the first pinch roller pair near the storage reel and the other free end thereof is capable of being selectively directed to the cutter or the second pinch roller pair. In this case, the switchable guide member is set to the position with its free end directed to the cutter, and the exposed film is led by the feed roller pair to the first pinch roller pair via the cutter and the switchable guide means in the mentioned order to be taken up by the storage reel. When developing the exposed film portion, the film is cut at the trailing end of the exposed portion by the cutter. With the cut end of the remainder of the film held by the feed roller pair, the switchable guide member is switched to the position wherein its free end is directed to the second pinch roller pair, while the first and second pinch roller pairs are driven backwardly. The trailing end of the exposed film portion is thus led out backward from the free end of the switchable guide member and is eventually led into the second pinch roller pair to be pinched thereby so that it can be reliably led backward to a relay path with the top thereof directed to the second pinch roller pair and leading to the developing unit. In this way, the exposed film forwarded from the photographing unit to the storage reel can be reliably fed to the developing unit.

Otherwise, a guide plate disposed between the first and second pinch roller pairs may be used as a guide member. While the photography is in process, the exposed film is forwarded to the storage reel through the feed roller pair and the first pinch roller pair so as to be taken up by the reel. After the exposed portion of the film is completely wound on the reel and the end of the exposed portion is cut by means of the cutter, the first pinch roller is reversely rotated so as to rewind the exposed film from the storage reel. Because the film has a tendency to curl, the exposed film is reliably forwarded to the second pinch roller pair along the guide plate and further fed stably to the developing unit.

The above and other objects, features and advantages of the invention will become more apparent from the following detailed description when the same is read with reference to the accompanying drawings.

DESCRIPTION OF THE PREFERRED EMBODIMENTS

This invention relates to a device for storing exposed film, which is adapted to a photographing and developing apparatus and basically comprises a feed roller pair placed near the entrance of the device, a cutter, a storage reel for the exposed film, first and second pinch roller pairs and a guide member disposed between the pinch roller pairs. This invention does not contemplate imposing any limitation on the construction of those constituent elements as illustrated in the drawings.

Figure 1:
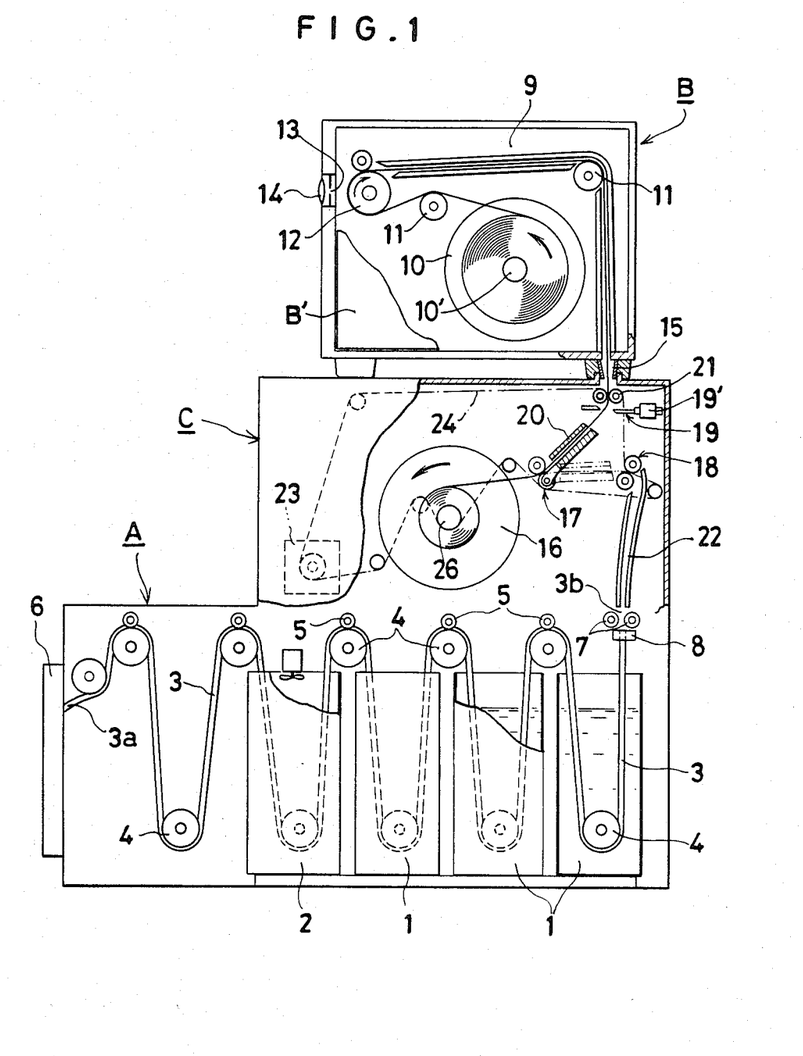
FIG. 1 is a schematic side sectional view showing a first embodiment of the device for storing exposed film according to the invention.

Referring to FIG. 1, the photographing and developing apparatus to which the film storing device of this invention is applied is composed of a conventional developing unit A and a conventional photographing unit B which is generally mounted detachably above the developing unit A. The developing unit A includes liquid vessels 1 for development, fixing and water washing respectively and a drying chamber 2 for blowing hot air therein. A winding development path 3 is defined through the successive liquid vessels and drying chamber. Idle rollers 4 are provided at the upper and lower U-turn points of the development path 3. Drive rollers 5 cooperate with the idle rollers at the upper U-turn points. With their rotation, the film is run at a fixed speed toward an outlet end 3a of the development path 3. As the film is fed along the development path 3, it is subjected to development, fixing, water washing and drying. The processed film emerging from the outlet 3a is collected in a storage box 6. Instead of the storage box 6, an auto-reel may be provided in the developing unit to take up the processed film appearing from the drying chamber on the auto-reel and take it out with the auto-reel from the developing unit.

At the inlet end 3b of the development path 3, a pair of feed rollers 7 and a detector 8, of photoelectric type for instance, for detecting the film end emerging from the feed rollers 7 are provided. When the detector 8 detects the end of the film, one of the feed rollers 7, which have up to that time been held separated, is urged against the other with the film therebetween to pinch the film, while the feed rollers 7 and drive rollers 5 are driven to feed the film. When the film has passed, the rollers 5 and 7 are stopped after the lapse of the time, determined by a timer, required for the end of the film appears at the outlet 3a.

The photographing unit B has a photographing chamber 9, one side of which is closed by a lid B' which can be opened and closed. In this embodiment, the photographing chamber 9 accommodates a supply reel 10 mounted on a reel shaft 10' with an elongate film wound thereon, a plurality of guide rollers 11 for guiding film paid off the supply reel 10 and a capstan 12 for forwarding the film passed thereround. While the film is forwarded by the capstan after a photographing switch is depressed by a document to be photographed, a rotary camera 14 with an exposure slit 13 photographs the document by causing exposure of the film around the capstan 12 to the document. When the document leaves the photographing switch, the capstan stops the progress of the film, so that the camera stops photographing. When the photographing switch is depressed by the document, an electromagnetic clutch between the shaft of a motor provided in the photographing unit and the shaft of the capstan is decoupled. An outlet cylinder 15 downwardly projects from the bottom of the photographing unit. The exposed film is discharged through the outlet cylinder 15 to the outside of the photographing chamber, In this embodiment, the outlet cylinder 15 extends to a slight extent into a film storage unit C according to the invention, which is provided in an upper part of the developing unit A, from above in a light sealing relation thereto.

In the film storage unit C, a storage reel 16 is provided for taking up exposed film emerging from the outlet cylinder 15. First and second pinch roller pairs 17 and 18 are provided in the neighborhood of the storage reel on one side thereof nearer the outlet cylinder, the first pinch roller pair being relatively nearer the reel and the second being relatively remote therefrom. A cutter 19 is provided between and above the first and second pinch roller pairs 17 and 18 and below the outlet cylinder 15. In this embodiment, a switchable guide means 20 having an inner path for film is provided as a guide member such that its one end is pivotally mounted at a position in the vicinity of the first pinch roller pair nearer the storage reel 16. It can be turned between two positions, i.e., one with its free end directed to the cutter 19 and the other with its free end directed to the second pinch roller pair 18. A feed roller pair 21 is provided near the entrance of the film storage unit C immediately above the cutter 19, i.e., between the outlet cylinder 15 and cutter 19. A relay guide path 22 is provided with its lower end facing the inlet of the development path 3b and its upper end facing the second pinch roller pair 18.

When the photographing switch is depressed in the photographing unit, the capstan 12, first pinch roller pair 17 and storage reel 16 are caused to continuously rotate forwardly. The film is thus forwarded until the trailing end of the portion exposed on the capstan passes by the cutter 19, and is then cut by the cutter 19. The cutter 19 may be operated for cutting action by, for instance, an electromagnet 19', and restored by a spring. The feed roller pair 21 serves to hold the cut end of the remainder of the film.

In response to an instruction indicative of the completion of cutting action of the cutter 19, the first pinch roller pair 17 and storage reel 16 are forwardly rotated slightly to a prescribed extent, whereby the trailing end of the separated exposed film portion is completely brought into the switchable guide means 20. Simultaneously with or after this, the switchable guide means 20 is turned to the position wherein its free end is directed to the second pinch roller pair 18. Simultaneously with the withdrawal of the trailing end of the exposed film into the switchable guide means 20 or after the switching of the switchable guide means 20 to the position with its free end directed to the second pinch roller pair 18, the first and second pinch roller pairs 17 and 18 commence to be reversely driven continuously. The storage reel 16 is driven by the force by which the exposed film thereon is backwardly pulled out with the reverse rotation of the first and second pinch roller pairs 17 and 18. The sequence of operations described above can be brought about automatically by sequence control. For example, a reversible motor 23 may be provided in the film storage unit C, and its torque may be transmitted to the shaft of each roller via an endless chain 24 or like coupling means, while when the motor is reversely driven the transmission of its torque to the feed roller pair and storage reel may be cut by a clutch.

Before or simultaneously with the switching of the switchable guide member to the position wherein the free end thereof is directed to the second pinch roller pair, the first pinch roller pair and storage reel are forwardly driven slightly to a prescribed extent sufficient to completely bring the trailing end of the separated exposed portion of the film into the switchable guide means for the following reason. Right after the film is cut by the cutter, the trailing end of the separated exposed portion of the film slightly extends out of the free end of the switchable guide means. If the switching of the switchable guide means is caused in this state, the free end thereof may fail to be correctly directed to the second pinch roller pair 18 due to contact of the free end of the film hanging from the free end of the switchable guide means with other components of the device. In this case, the trailing end of the exposed film cannot be led into the second pinch roller pair. This is eliminated by bringing the trailing end of the exposed film in advance into the switchable guide means. Also, this permits the switching action of the switchable guide means and reverse rotation of the first and second pinch roller pairs to be carried out simultaneously. In this case, the time necessary for the development can be reduced by an amount corresponding to the time required for the turning of the switchable guide means compared to the case in which the reverse rotation of the first pinch roller pair is started after the completion of turning of the switchable guide means. Of course in this case the extent to which the trailing end of the exposed film is withdrawn into the switchable guide means is set to be equal or slightly greater than the extent to which the exposed film is fed backwardly with the reverse rotation of the first pinch roller pair during the turning of the switchable guide means.

The turning action of the switchable guide means is caused by an electromagnet. For example, the switchable guide means may be locked by a locking mechanism in its position with its free end directed to the second pinch roller pair, and the lock mechanism may be released to cause the restoration of the switchable guide means to the other position with the free end directed to the cutter by means of a spring. Alternatively, the switchable guide means may be operated by making use of the forward and reverse rotation of the first pinch roller pair.

Where the film storage unit is assembled between the photographing unit in which the film is forwarded by the capstan at a fixed speed during photographing and the developing unit in which the exposed film is fed at a fixed speed along the development path during development, the speed at which the feed roller pair above the cutter, first pinch roller pair and storage reel are forwardly driven to feed the film during photographing, may be set to the photographing speed in the photographing unit, while the speed at which the storage reel is driven by the exposed film fed backward by the first and second pinch roller pairs, may be set to the developing speed in the developing unit. This arrangement can be realized in the simplest structure as shown in the embodiment of FIG. 1.

Figure 3:
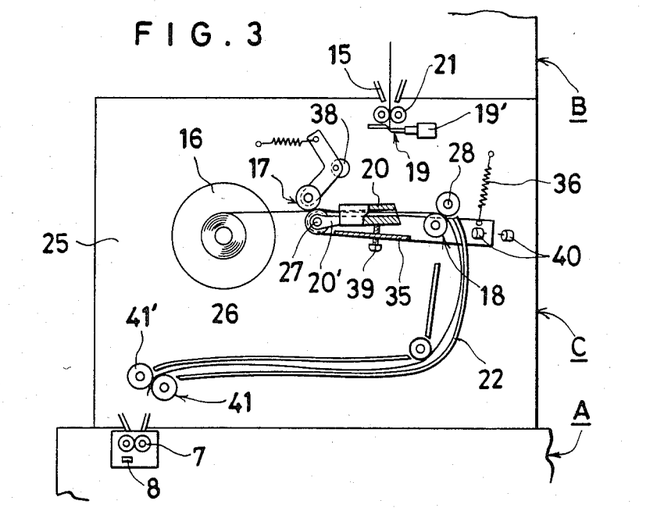
FIG. 3 is a view similar to FIG. 2 but showing the device in a state in which the exposed film is being fed backwards.
Figure 4:
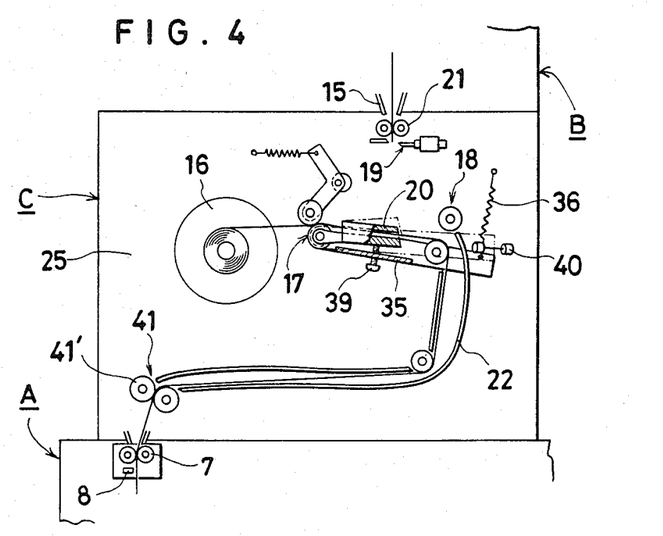
FIG. 4 is a view similar to FIG. 2 but showing the device in a state in which the exposed film is fed backward.
Figure 5:
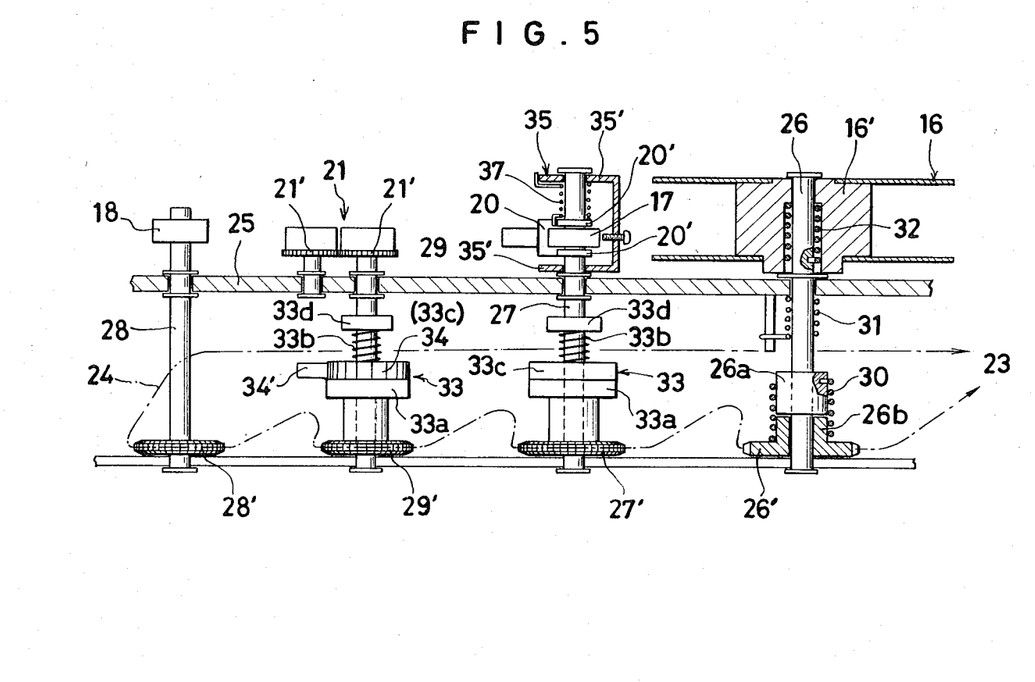
FIG. 5 is a plan sectional view, to an enlarged scale, showing a storage reel and film transport rollers.

An effective arrangement to permit use of any one of plural photographing units of slightly different photographing speeds and any one of plural developing units of slightly different developing speeds in combination, is as follows. The speed of forward feeding of the film is set to be slightly higher than the highest photographing speed. Also, in order to prevent breakage of the film, the feed roller pair, first pinch roller pair and storage reel are adapted to slip on their rotating shafts if the tension in the film exceeds a certain value during the forward rotation. Further, the speed of the backward feeding of the exposed film by the first and second pinch roller pairs is set to be slightly higher than the highest developing speed. Furthermore, in order to prevent the occurrence of entangling of film at the inlet of the development path due to excessive backward feed of film, it may be arranged such that the command for supply of the exposed film by the developing unit is triggered by the detection of tension in the exposed film so that the exposed film is fed backward every time the developing unit issues a supply command. FIGS. 2 through 5 show an embodiment of the invention as summarized above. In this instance, the speed at which the film is forwarded by rotation of the storage reel and pinch rollers driven from the motor 23 via the chain 24 is slightly higher than the highest photographing speed, and the speed of backward feed of the exposed film is slightly higher than the highest developing speed. As shown in FIG. 5, in the film storage unit an intermediate wall plate 25 rotatably supports a shaft 26 of the storage reel 16, a shaft 27 of one of the first pinch roller pair 17, a shaft 28 of one of the second pinch roller pair 18 and a shaft 29 of one of the feed roller pair 21. For the storage reel, a clutch, e.g., unidirectional clutch 30, is provided between the shaft 26 and a sprocket wheel 26 loosely fitted on the shaft 26 and rotated by a chain 24. When the motor is driven forwardly to cause forward feed of the film, the clutch 30 is coupled to cause forward rotation of the storage reel. In other words, when the motor is reversely driven, the clutch 30 is decoupled so that the storage reel is not reversely rotated. The shaft 26 is provided with a brake 31, which brakes the shaft when the motor is reversely rotated while applying no braking action when the motor is forwardly driven. When the motor is forwardly rotated for photographing, the clutch 30 is coupled and the brake 31 does not apply braking action on the shaft 26 of the storage reel. The storage reel 26 is thus forwardly rotated through a slip mechanism 32. When the film tension reaches a certain level, however, the storage reel 16 slips on the slip mechanism 32, that is, it is stationary on the forwardly rotating shaft 26 so that the film can be prevented from being excessively pulled and broken. At the time of development, the sprocket wheel 26' is reversely rotated with the reverse rotation of the motor, but since the clutch 30 is decoupled the shaft 26 is not reversely rotated but is held stationary by the brake 31. While the exposed film position is backwardly fed by the first and second pinch roller pairs 17 and 18, the storage reel is driven as it slips on the slip mechanism 32 with respect to the shaft 26 which is stationary at this time.

In the embodiment, the clutch 30 consists of a boss 26a secured to the shaft 26' and a coil spring fitted on the boss 26a and a boss 26b of the sprocket wheel and having one end attached to the boss 26a and the other end attached to the boss 26b. When the sprocket wheel 26' is forwardly rotated, the coil spring is reduced in diameter by the friction between the outer periphery of the boss 26b and the inner periphery of the coil spring so that the rotation of the sprocket is transmitted to the shaft. When the sprocket wheel is reversely rotated, however, the diameter of the coil spring is increased so that the rotation is not transmitted to the shaft. The brake 31 also consists of a coil spring closely fitted on the shaft 26 and having one end secured to the film storage unit. At the time of photographing, the outer diameter of the shaft which is forwardly rotated with the clutch 30 coupled increases the diameter of the coil spring so that no braking action is applied. When the shaft is to be rotated reversely, however, the coil spring is reduced in diameter due to friction so that the shaft cannot be reversely rotated. The slip mechanism 32 consists of a coil spring closely fitted on the shaft 26 and having one end attached thereto. The inner periphery of a hub 16' of the storage reel snugly fits on the coil spring. The shaft 26 which is forwardly rotated with the clutch coupled at the time of photographing has its outer periphery in frictional engagement with the inner periphery of the coil spring and reduces the diameter thereof, so that the storage reel 16 is rotated only by the frictional torque of the coil spring. When a load in excess of the frictional torque is applied to it, the storage reel stops rotation and slips. Further, when the exposed film is backwardly fed at the time of development, the coil spring is reduced in diameter due to the friction between the inner periphery of the reel hub and the outer periphery of the coil spring, so that the storage reel slips against the frictional torque.

While in this embodiment the clutch 30, brake 31 and slip mechanism 32 all consist of coil springs, this is by no means limitative; for instance it is possible to use an electromagnetic clutch for the clutch 30 or use a uni-directional clutch for the clutch 30 and brake 31 or use a frictional contact type plate for the slip mechanism 32.

The shaft 17 of one of the first pinch roller pair 17 and the shaft 27 of one of the feed rollers 21 are provided with respective sprocket wheels 27' and 29', and slip mechanisms 33 are provided between the individual shafts and sprocket wheels 27' and 29'. Thus, when the motor is forwardly driven, the first pinch roller pair 17 and feed roller pair 21 are rotated in the direction of forwardly feeding the film. When a tension in excess of a certain level is produced in the film, although the sproket wheels 27' and 29' continue to be forwardly rotated, the roller 21 slips on the slip mechanism 33 to prevent breakage of the film. When the motor is reversely rotated, the first pinch roller pair 17 is reversely rotated to backwardly feed the exposed film portion which has been taken up on the storage reel to the developing unit A. The feed roller pair 21, however, is prevented against reverse rotation by a clutch or reverse rotation prevention mechanism 29, that is, it slips on a slip mechanism 33 relative to the reversely rotating sprocket wheel 29, so that the end of the remainder of the film having been cut by the cutter 19 is held in position by the feed roller pair 21.

In this embodiment, the slip mechanisms 33 each consist of a disc 33a secured to each of the sprocket wheels 27' and 29', a disc 33c loosely fitted on each of the shafts 27 and 29 and urged against the disc 33a by a spring 33b and a spring retainer 33d secured to each shaft and retaining the other end of the spring 33b. This is, however, by no means limitative. Further, the clutch or reverse rotation prevention mechanism 34 may be a magnetic clutch or uni-directional rotary clutch. In this embodiment, a ratchet wheel and a ratchet 34' are used, with the ratchet wheel also serving as a disc 33c.

The second pinch roller pair 18 does not act on the film at the time of photographing. Therefore, a sprocket wheel 28' is secured to the shaft 28 of one of these rollers. During photographing, the roller is thus driven under no load with the forward rotation of the motor. During development, the roller is reversely rotated with the reverse rotation of the motor for backwardly feeding the exposed film. The feed roller pair 21 is provided with respective gears 21' meshing with each other so that these two roller pairs are interlockedly rotated when the motor is forwardly rotated. In this embodiment, the lower roller of the first pinch roller pair 17 is driven by the sprocket wheel 27', and the upper roller is rotatably mounted on a lever 17a and urged against the lower roller by a spring 17b. The shaft 27 of the lower roller of the first pinch roller pair 17 penetrates two arms 20' projecting from the opposite sides of the stem of the switchable guide means 20 on its opposite sides. The shaft 27 also penetrates the opposite side walls 35' of a rockable member 35 having a channel-shaped sectional profile, the roller and opposite arms of the switchable guide means being found between the opposite side walls 35'.

The switchable guide means 20 and rockable member 35 are pivotally mounted on the shaft 27 of the lower first pinch roller pair 17. The upper one of the second pinch roller pair 18 is driven by a sprocket wheel 28'. The lower roller is rotatably mounted on the rockable member 35 near the free end thereof. The free end of the rockable member 35 is upwardly biased by a spring 36, so that the lower roller is upwardly biased against the upper roller. In other words, the upper roller also serves as a stopper against the upward swing of the rockable member.

Figure 2:
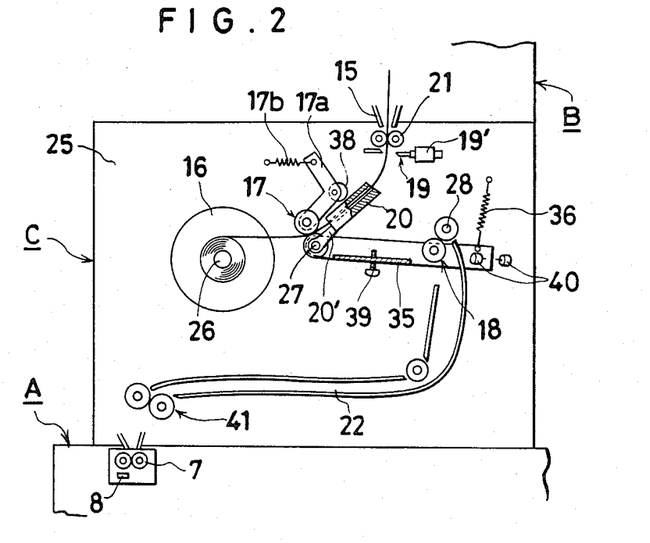
FIG. 2 is a schematic sectional view showing another embodiment of the device for storing exposed film according to the invention in a state in which exposed film is being taken up.

A coil spring 37 is fitted on the shaft 27 of the first pinch roller pair 17 supporting the switchable guide means 20 and rockable member 35. One of its opposite ends is attached to one of the arms of the switchable guide means, while the other end is adapted to be hooked on the rockable member 35 when the shaft 27 is reversely rotated. When the shaft 27 is forwardly rotated at the time of photographing, the diameter of the spring 37 is increased due to friction between the inner periphery of the spring and the outer diameter of the shaft 27, so that the switchable guide means 20 is turned in the same direction as the shaft 27 due to its friction therewith until it strikes a stopper 38 to direct its free end to the cutter 19. The stopper 38 is in the form of a disc eccentrically mounted on the lever 17a. The position of the switchable guide means is adjusted by the rotation of the stopper 38 about the axis of rotation thereof. The stopper 38 may be supported by a screw, which may be screwed to secure the disc stopper in position. When the shaft 27 is reversely rotated at the time of development, the diameter of the spring 37 is reduced due to friction between the inner periphery of the spring and the outer periphery of the shaft 27, so that the spring 37 is rotated in unison with the shaft 27, thus causing the switchable guide means 20 to be turned in the direction of rotation of the shaft 27 until the switchable guide means 20 is brought to a position, which is determined by a stopper 39 provided on the rockable member 35 and in which its free end is directed to the second pinch roller pair 18. When the switchable guide means strikes the stopper 39, the free end of the coil spring 37 is hooked on the rockable member 35. Thus, the diameter of the coil spring 37 can no longer be further reduced, and subsequently the shaft 27 slips on the inner periphery of the spring 37. It is to be noted that while the switchable guide means 20 is in its position with its free end directed to the cutter 19 during photographing (as shown in FIG. 2), when the shaft 27 of the first pinch roller pair is reversely rotated to backwardly feed the exposed film with the reverse rotation of the motor caused after the exposed film is separated by the cutter 19 and its end is brought into the switchable guide means by subsequent slight reverse rotation of the motor, the switchable guide means 20 is turned downward to a position with its free end directed to the second pinch roller pair 18, and the shaft 27 is subsequently rotated while slipping in the coil spring 37 to cause reverse rotation of the first pinch roller pair 17. The exposed film is thus backwardly fed into the switchable guide means by the first pinch roller pair, and the end of the exposed film emerging from the free end of the switchable guide means is led between the second pinch roller pair 18. In this way, the exposed film is fed backward into the relay guide path 22 by the first and second pinch roller pairs driven in synchronism with one another (as shown in FIG. 3).

When the end of the exposed film having passed between the feed rollers 7 reaches the detector 8, the reverse rotation of the motor in the film storage unit is stopped, and the exposed film is pinched by the feed rollers 7 and fed thereby into the development path. When the reverse rotation of the motor in the film storage unit is stopped, the coil spring 37 on the shaft 27 is loosened so that the switchable guide means 20 tends to be turned upwardly. However, since the exposed film is fed by the feed rollers 7 into the development path in the developing unit B, it is pulled and its portion between the first and second pinch roller pairs 17 and 18 is taut, so that the switchable guide means cannot be turned upwards. With the reverse rotation of the motor in the film storage unit stopped and the exposed film pulled and fed into the development path by the feed rollers 7, the exposed film is pulled out for a while by the pulling force of the feed rollers 7 while driving the storage reel 16 and first and second pinch roller pairs 17 and 18. The tension in the exposed film is gradually increased, and when it exceeds the biasing force of the spring 36 upwardly biasing the free end of the rockable member 35, the rockable member 35 is turned downward against the spring 36. When the rockable member 35 is turned downward to a certain extent, the detector 40, which may be of a photoelectric type, detects this and causes reverse rotation of the motor 23 (FIG. 4). Thus, the first and second pinch roller pairs 17 and 18 feed out the exposed film from the storage reel 16 at a speed higher than the feed speed of the feed rollers 7 while driving the storage reel 16. The tension in the exposed film is thus gradually reduced so that the rockable member 35 is gradually upwardly turned by the biasing force of the spring 36. The lower roller of the second pinch roller pair 18 thus is brought back to the position urging the upper roller, whereupon the detector 40 stops the reverse rotation of the motor 23.

It is to be noted that the detector 40 detects the command for supply of the exposed film by the developing unit from the downward swing of the rockable member caused by the increase of the exposed film tension. Every time it detects the command, it positively causes reverse rotation of the first and second pinch roller pairs 17 and 18 to backwardly feed the exposed film to the developing unit until the rockable member is upwardly brought back again by the biasing force of the spring 36.

Until the end of the exposed film (i.e., the leading end thereof when taken up on the storage reel) appears from the second pinch roller pair 18 to be fed to the relay guide path 22, the detector 20 causes the first and second pinch rollers to backwardly feed the exposed film positively every time the rockable member is turned downwards to a certain extent with increase of the film tension. This prevents breakage of the exposed film and permits combination of photographing units with developing units of different developing speeds.

The detector 40 may be of the type in which a light path is blocked when the lower roller of the second pinch roller pair is upwardly urged against the upper roller by the rockable member 35 upwardly biased by the spring 36 and which causes reverse rotation of the motor when the light path is established with the downward swing of the rockable member 35. Alternately, it may be of the type in which a light path is blocked to cause reverse rotation of the motor when the rockable member is turned downwards to a certain extent and is established when the rockable member is returned upwards by the biasing force of the spring.

The position of the inlet of the development path may vary with the developing unit. This may be coped with by selecting the shape of the relay guide path such that the outlet of the relay guide path communicates with the inlet of the development path. In the example shown in FIGS. 2 through 4, a fourth pinch roller pair 41 is disposed at the outlet of the relay guide path 22. One of these rollers, like the second pinch roller pair 18 driven by the shaft 28, is rotated in the same direction as the motor during the forward and reverse rotation thereof, and at the time of development it cooperates with the first and second pinch roller pairs to backwardly feed the exposed film. The fourth pinch roller pair 41 is provided because the relay guide path provides a comparatively large distance between the second pinch roller pair 18 and its outlet, and it is not needed where the distance is small enough. When they are provided, the speed of the drive rollers may be the same as the first and second pinch roller pairs if the first and second pinch roller pairs are reversely rotated to a slight extent every time the developing unit demands supply of the exposed film. If necessary, the upper one of the fourth pinch roller pair 41' may be made a drive roller while the lower roller is upwardly urged against the upper roller by means of a spring such that when the exposed film is stretched by the pulling force of the feed rollers 7 it is forced downward and separated from the upper drive roller.

Though, in the preceding embodiment, all the rollers including the feed roller pair above the cutter and the first and second roller pairs in the film storage unit are driven only by one motor 23, this film feeding system may be so constructed that the feed roller pair 21 and the film storage reel 16 are driven by a separate motor rotatable in one direction and the first and second pinch roller pairs 17 and 18 are driven by another separate motor rotatable forwardly and reversely. With this system utilizing two motors, the number of parts such as the slipping means and the clutch means as illustrated in FIG. 5 can be remarkably reduced.

Figure 6:
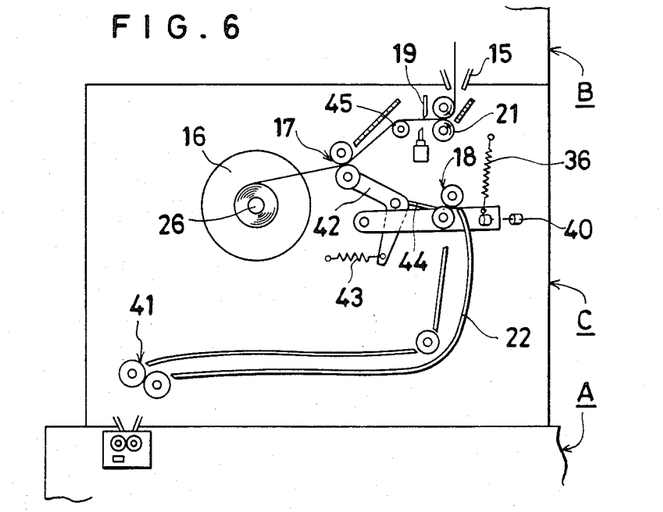
FIGS. 6 through 8 are explanatory diagrams illustrating yet another embodiment of the device according to the present invention.
Figure 7:
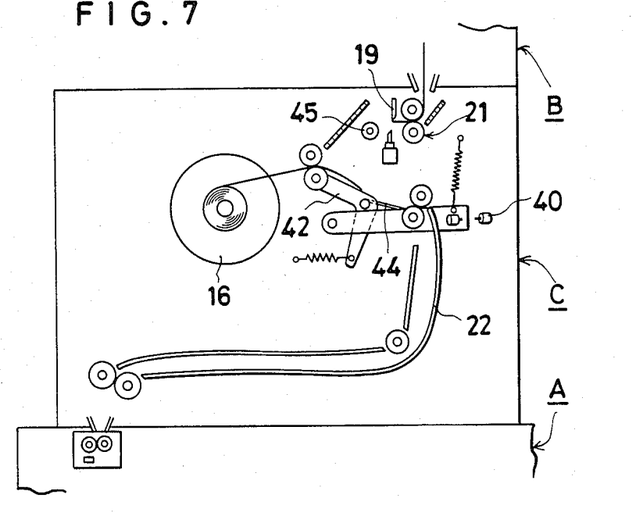
Figure 8:
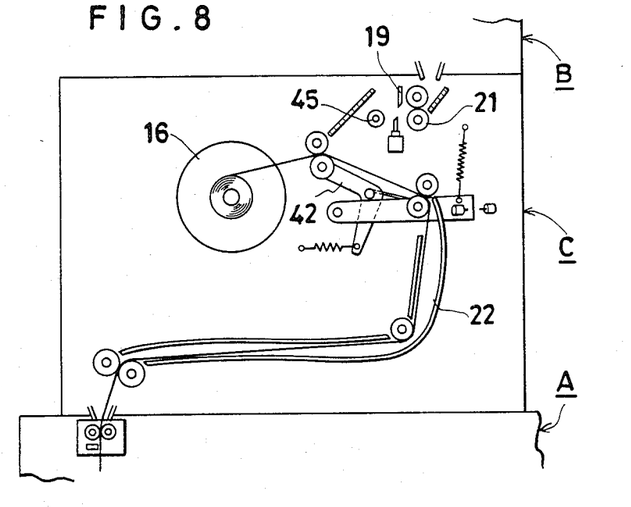

FIGS. 6 through 8 illustrate another embodiment in which a guide plate 44 is used as a substitute for the switchable guide means 20 used in the preceding embodiment. Identical or similar components of this embodiment are denoted by like numerical symbols. In this embodiment, the feed roller pair 21 and the cutter 19 are vertically arranged, and an auxiliary roller 45 is disposed on the way from the cutter 19 to the first pinch roller pair 17 so that the leading end of the film, which is apt to be directed downward due to its curl tendency, can reach the first pinch roller pair 17 without fail. The exposed film is wound on the storage reel 16 while being guided by the auxiliary roller 45 and the first pinch roller pair 17 (FIG. 6). When the exposed portion of the film is completely taken up by the reel 16, the end of the exposed portion of the film is cut by the cutter 19 and further, the reel is somewhat rotated forwardly so as to lead the film into the reel to a small extent. As a result, the tail end of the exposed film slips away from the auxiliary roller 45 onto the upper surface of a supporting arm 42 due to the curl tendency of the film (FIG. 7). The supporting arm 42 serves to rotatably mount one roller of the first pinch roller pair at its one end and bring the one roller into elastic contact with the other roller of the first pinch roller pair by the energizing force of a spring 43.

Thereafter, the first pinch roller pair 17 is reversely rotated to rewind the exposed film from the storage reel 16, thereby stably forwarding the exposed film having a curl tendency to the second pinch roller pair 18 along the supporting arm 42 serving as a guide and the guide plate 44. Then, the exposed film is led into the developing unit A via the relay guide path 22 similarly to the preceding embodiment (FIG. 8).

While the film storage unit may be incorporated in the developing unit as in the preceding embodiment of FIG. 1, it may instead be incorporated in the photographing unit. As a further alternative, it may be provided independently of the developing and photographing units. In any case, it is possible to permit development of an exposed portion of film right after interruption of photographing.

What is claimed is:

1. A device for storing exposed film for a photographing and developing apparatus, which is provided between a developing unit and a photographing unit and includes a storage reel for taking up an exposed portion of film fed out from a film roll for photographing and a cutter for cutting the exposed portion of the film fed from the photographing unit, comprising:
    a first pinch roller pair disposed in the neighborhood of the storage reel in a reversibly rotatable state;
    a second pinch roller pair disposed in a reversibly rotatable state at a position spaced apart from the storage reel and cutter;
    a feed roller pair capable of only forward rotation disposed above the cutter and adapted to feed the exposed film from the photographing unit to the storage reel; and
    a guide member disposed between said first and second pinch roller pairs and adapted to introduce the exposed film fed from said storage reel via said first pinch roller pair to said second pinch roller pair.

2. The device for storing exposed film for a photographing and developing unit according to claim 1, wherein said guide member is a switchable guide means for guiding film therethrough and having one end pivotally mounted in the vicinity of said first pinch roller pair, said switchable guide means being capable of being selectively directed to either the cutter or the second pinch rollers.

3. The device for storing exposed film for a photographing and developing unit according to claim 1, wherein said guide member is a guide plate disposed between said first and second pinch roller pairs.

4. The device for storing exposed film for a photographing and developing apparatus according to claim 1, wherein the speed at which the first pinch roller pair and storage reel are forwardly rotated to forward the exposed film during photographing performed in the photographing unit is set equal to the photographing speed in the photographing unit, and the speed at which the first and second pinch roller pairs are reversely rotated to backwardly feed the exposed film to the developing unit is set equal to the developing speed in the developing unit.

5. The device for storing exposed film for a photographing and developing unit according to claim 4, wherein when said first and second pinch roller pairs are reversely rotated to backwardly feed the exposed film, the storage reel is driven by the backward feeding of the exposed film with the reverse rotation of the first and second pinch roller pairs.

6. The device for storing exposed film for a photographing and developing apparatus according to claim 1, wherein the speed at which the first pinch rollers and storage reel are forwardly rotated to forward the exposed film during photographing performed in the photographing unit is higher than the photographing speed in the photographing unit, said first pinch roller pair and storage reel are capable of slipping on their respective shafts, the speed at which the first and second pinch roller pairs are reversely rotated to backwardly feed the exposed film to the developing unit is higher than the developing speed in the developing unit, the first and second pinch roller pairs are intermittently reversely driven, and the storage reel is capable of being driven by the backward feeding of the exposed film with the reverse rotation of the first and second pinch roller pairs.

7. The device for storing exposed film for a photographing and developing unit according to claim 6, wherein the intermittent reverse rotation of the first and second pinch roller pairs is caused in accordance with the tension in an exposed film being pulled for development in the developing unit.

8. The device for storing exposed film for a photographing and developing apparatus according to claim 2, wherein switching of the switchable guide means from the position with the free end directed to the cutter to the position with the free end directed to the second pinch roller pair is caused simultaneously with slight forward rotation of the first and second pinch roller pairs to being the trailing end of the separated exposed film into the switchable guide means caused in response to a signal indicating that the cutting of the film by the cutter is completed.

9. The device for storing exposed film for a photographing and developing apparatus according to claim 2, wherein switching of the switchable guide means from the position with the free end directed to the cutter to the position with the free end directed to the second pinch roller pair is caused after the trailing end of the separated exposed film has been brought into the switchable guide means by the storage reel and first pinch roller pair.

10. The device for storing exposed film for a photographing and developing apparatus according to claim 2, wherein switching of the switchable guide means from the position with the free end directed to the second pinch roller pair to the position with the free end directed to the cutter is caused when the leading end of the exposed film emerging as the trailing end from the free end of the switchable guide means is held by the second pinch roller pair.

11. The device for storing exposed film for a photographing and developing apparatus according to claim 2, wherein the switchable guide means is slippably pivotally mounted on the shaft of one of the rollers of the first pinch roller pair and is normally set by the energizing force of a spring in the position with its free end directed to the cutter and brought to the position with its free end directed to the second pinch roller pair against the energizing force of the spring with the reverse rotation of the first pinch roller pair.

* * * * *